Nov. 12, 1968  O. J. CATELLI  3,411,072
TEST APPARATUS FOR INDICATING VOLTAGE AND CURRENT CONDITIONS OF
PLUG-IN COMPONENTS IN THEIR ASSOCIATED CIRCUITRY
Filed Aug. 17, 1964

INVENTOR.
Orlando J. Catelli
BY
Hovey, Schmidt, Johnson & Hovey
ATTORNEYS.

United States Patent Office 3,411,072
Patented Nov. 12, 1968

3,411,072
TEST APPARATUS FOR INDICATING VOLTAGE AND CURRENT CONDITIONS OF PLUG-IN COMPONENTS IN THEIR ASSOCIATED CIRCUITRY
Orlando J. Catelli, Fort Leavenworth, Kans.
(384 Andover Drive, Pacifica, Calif. 94044)
Filed Aug. 17, 1964, Ser. No. 389,922
3 Claims. (Cl. 324—23)

ABSTRACT OF THE DISCLOSURE

A tester for vacuum tubes or other plug-in or "pluck-out" type components has an adapter which fits into the socket for the tube to be tested, such socket being a part of the actual electrical apparatus in which the tube is utilized. The tube under test is plugged into a test socket on the tester, the arrangement being such that, by appropriate switching, voltage, current, and resistance tests can be run on the tube while the apparatus is in normal operation.

---

Figure 1:
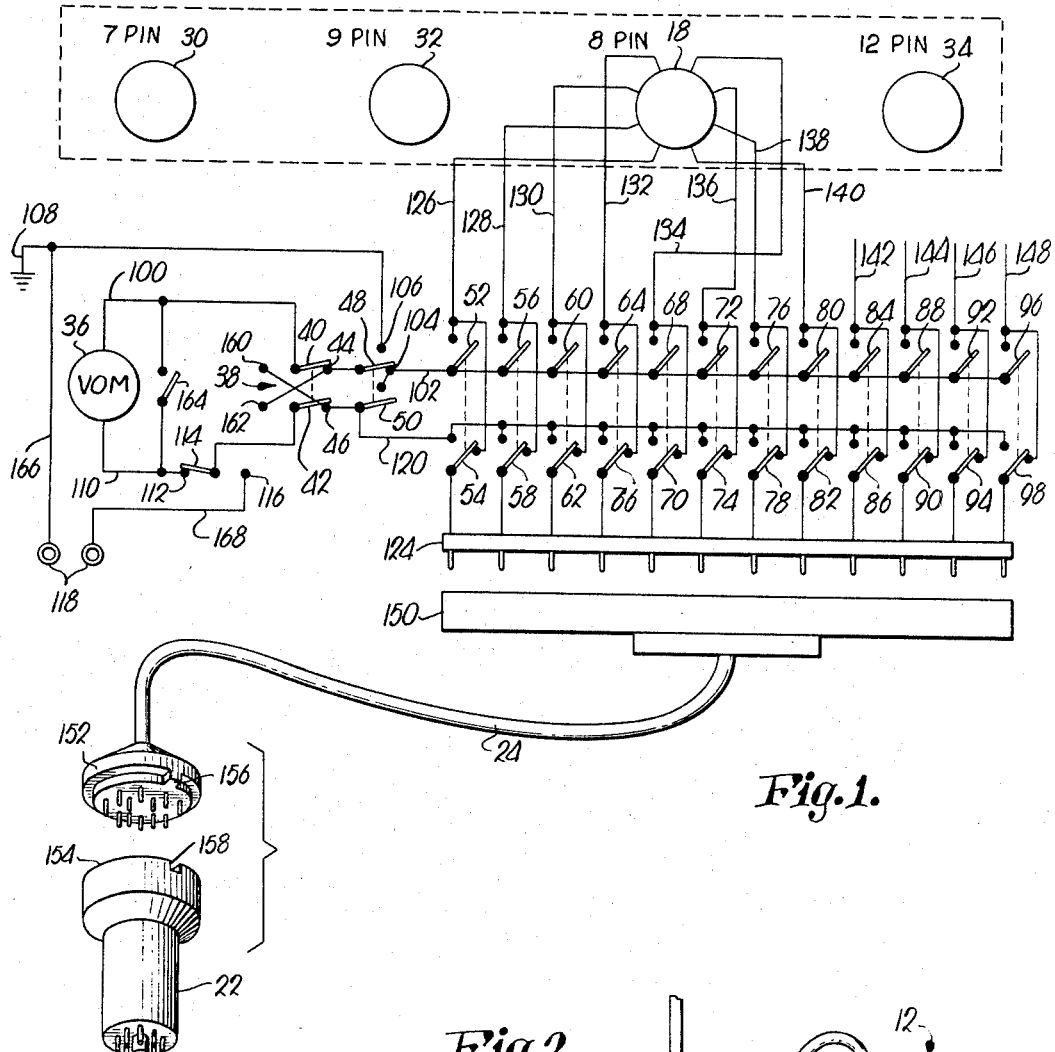

This invention relates generally to electrical testing devices and, more specifically, to a device for testing a plug-in type electrical component and its associated circuitry while the apparatus utilizing the component is in operation.

Testers for vacuum tubes in present use require that the tube be separated from the apparatus with which it is employed in order to effect the testing operation. Manifestly, such a testing scheme cannot give an indication of actual tube operating conditions, but only simulates tube operation in a strictly test environment. Therefore, if personnel servicing electrical apparatus desire to check the operation of the vacuum tube or other plug-in component and its associated circuitry, test probes must be inserted into the equipment and connections temporarily broken if current readings are desired.

Whether a technician is servicing a television set or a large, modulized piece of electrical equipment, it is extremely inconvenient to have to gain access to the underside of the chassis in order to make dynamic tests. Frequently, this involves hazards both to test equipment and to the servicing technician. For example, in reaching inaccessible portions of the chassis, shorting of the test probes may occur and, in any event, the technician's hands are not free for making adjustments, perusing schematic diagrams, or other activities.

It is, therefore, the primary object of this invention to provide a testing device which will enable vacuum tubes or other plug-in or "pluck out" type components to be tested under actual operational conditions without encountering the disadvantages mentioned above.

Another important object of this invention is to provide such a testing device that will measure current flow through the various connections of a component under test, as well as voltage between a given connection and a reference point.

It is still another important object of the instant invention to provide a testing device as aforesaid which permits the apparatus, with which the component under test is utilized, to remain operational while the component is removed from the apparatus itself for testing of the component and its asociated circuitry within the apparatus.

Yet another object of this invention is to provide such a testing device which may also be utilized to measure the resistance present in the component under test and its circuitry when the apparatus with which the component is employed is rendered inoperative.

Other objects will become apparent as the detailed description proceeds.

Figure 2:
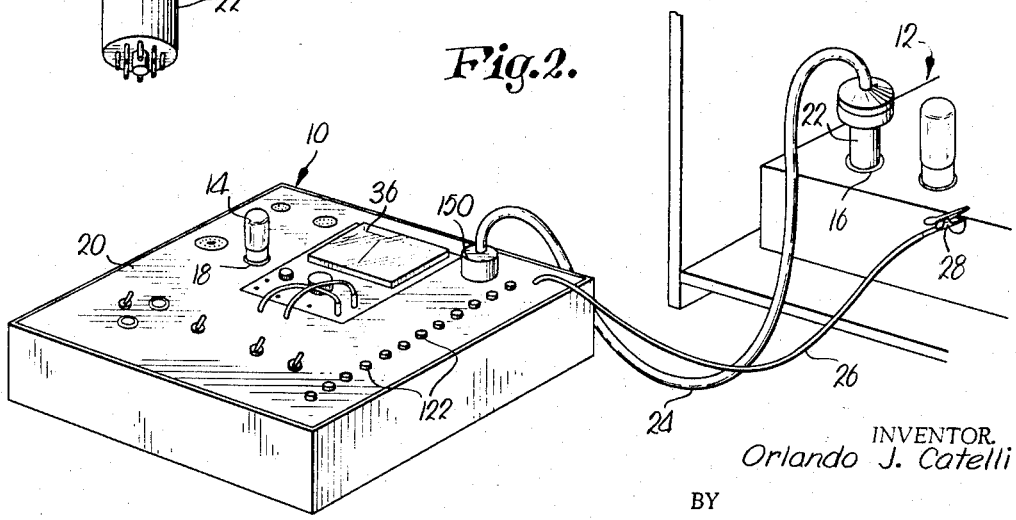

In the drawing:

FIGURE 1 shows the tester of the instant invention, the circuitry thereof being illustrated by an electrical schematic diagram and the adapter being shown by an exploded perspective view; and FIG. 2 is a pictorial view illustrating the tester in operation, the electrical apparatus under service being shown fragmentarily.

Referring first to FIG. 2, the testing device 10 of the instant invention is illustrated in association with electrical apparatus 12. A vacuum tube 14 normally fits into a socket 16 on apparatus 12, but in the illustration of FIG. 2, tube 14 is shown plugged into a test socket 18 on device 10. Test socket 18 is one of four such sockets illustrated, the sockets being mounted on one wall portion or panel of a housing 20 which encases the various parts and circuitry of device 10.

It may be seen that an adapter 22 (shown in detail in FIG. 1) is received by socket 16 and is connected to test device 10 by a multiconductor cable 24. Additionally, a ground lead 26 extends from device 10 to the chassis of apparatus 12 and is temporarily fixed to the latter by an alligator clip 28. FIG. 2 portrays the testing of tube 14 and its associated circuitry which forms a part of apparatus 12. As will be fully appreciated as this specification progresses, the electrical apparatus 12 is maintained operative during the testing of tube 14, electrical connections between the tube and the apparatus being effected by adapter 22, cable 24 and components of device 10 to be fully described hereinafter.

Attention is now directed particularly to FIG. 1 which schematically illustrates the circuitry of testing device 10. Additional test sockets 30, 32 and 34 are shown, although connections thereto are omitted for clarity. It will be understood that the various sockets 18, 30, 32 and 34 are of different types, such as 7 pin miniature, 9 pin miniature, 8 pin octal, and 12 pin compactron. Manifestly, other test sockets may be provided, depending on the number of pin configurations desired to be accommodated.

Device 10 employs a volt ohm milliammeter 36, a reversing switch 38 having movable poles 40 and 42 normally closed against contacts 44 and 46 respectively, a double-pole, double-throw selector switch having movable poles 48 and 50, and twelve double-pole, double-throw circuit switches having movable poles 52 and 54, 56 and 58, 60 and 62, 64 and 66, 68 and 70, 72 and 74, 76 and 78, 80 and 82, 84 and 86, 88 and 90, 92 and 94, and 96 and 98. A lead 100 extends from one electrical side of meter 36 to pole 40 of reversing switch 38, contact 44 thereof being interconnected with pole 48 of the DPDT selector switch. A lead 102 interconnects the movable poles 52, 56, 60, 64, 68, 72, 76, 80, 84, 88, 92 and 96 of the twelve circuit switches and is connected to one of the contacts 104 associated with pole 48. The other contact 106 associated with pole 48 is grounded as illustrated at 108. Ground connection 108 is a voltage reference point for meter 36 and is normally formed through the use of lead 26 and clip 28, as illustrated in FIG. 2. Generally speaking, therefore, this will be the chassis ground of the apparatus under test.

A lead 110 extending from the other electrical side of meter 36 is connected with a contact 112 associated with the movable pole 114 of a single-pole, double-throw auxiliary test equipment switch. Such auxiliary equipment may be connected to device 10 through the use of a pair of jacks 118, one of said jacks being connected to the other contact 116 of the auxiliary equipment switch. The other jack 118 is connected to ground at 108.

Pole 114 of the equipment switch is connected to pole 42 of reversing switch 38, contact 46 of the reversing switch being electrically connected to pole 50 of the selector switch. Pole 50, in turn, is connected by a lead 120 to the normally open contact associated with each of the poles 54, 58, 62, 66, 70, 74, 78, 82, 86, 90, 94 and 98 of the twelve circuit switches. These circuit switches may be of the push button type as illustrated by the row of buttons 122 in FIG. 2, and spring-biased to normally hold the various poles in the positions shown in FIG. 1. It should be noted that only the normally open contact asociated with poles 52, 56, 60, 64, 68, 72, 76, 80, 84, 88, 92 and 96 are shown, since the normally closed contacts thereof are not utilized.

A 12 pin male connector 124 is illustrated in FIG. 1, each of the pins thereof being connected with one of the poles 54, 58, 62, 66, 70, 74, 78, 82, 86, 90, 94 and 98. The normally closed contact of each of these poles is electrically connected to the normally open contact of the other pole of the switch. These contacts are, in turn, electrically connected by leads 126, 128, 130, 132, 134, 136, 138, 140, 142, 144, 146 and 148 to corresponding connections on sockets 18, 30, 32 and 34. It should be understood, however, that since socket 34 is the only socket having twelve connections, all of the leads 126–148 will be connected to only this one test socket. As illustrated, connections to sockets which receive fewer than twelve pins will utilize a lesser number of leads 126–148, connections to the 8 pin octal socket 18 being effected by the first eight leads 126–140 as shown.

The pins of the male connector 124 protrude outwardly from housing 20 and are received by a mating female connector 150 attached to one end of cable 24. The conductors (not shown) within cable 24 interconnect connector 150 with a male plug 152 which is received by a mating female connector 154 in one end of adapter 22. A key 156 on plug 152, and a keyway 158 on connector 154, assure proper interconnection thereof. The base of adapter 22 is illustrated as having an 8 pin octal configuration, but it may be appreciated that the pin configuration will depend on the type of socket 16 associated with the tube 14 under test. The various adapters 22 employed, however, will all have the same female connector 154 as a part thereof so that any adapter may be connected with plug 152. In this manner, only the adapters 22 need be changed as different socket configurations are encountered.

In operation, the vacuum tube, transformer, filter, or other plug-in or "pluck-out" component desired to be tested, is removed from its socket and placed in a corresponding socket on device 10. A mating adapter 22 for the socket of the component is then plugged into such socket and the apparatus rendered operative. As discussed earlier, this is illustrated in FIG. 2 which shows adapter 22 received by socket 16 which is mounted on the chassis of electrical apparatus 12.

In referring to FIG. 1, it may be appreciated that the twelve circuit switches in their normal positions as shown, interconnect cable 24 with the appropriate connections on the test sockets. Thus, when the vacuum tube 14 under test, illustrated in FIG. 2, is plugged into test socket 18, apparatus 12 will operate in the same manner as if tube 14 were plugged into its socket 16.

Since all of the twelve circuit switches function in identically the same manner, operation of only one of these switches will be discussed herein. Assuming, for example, that the technician desires to ascertain the current flowing through lead 126, the push button 122 which operates the ganged poles 52 and 54 is depressed to move these poles into engagement with their left-hand or normally open contacts. Further assuming that reversing switch 38 is properly set in accordance with the polarity of the current encountered and meter 36 is set at the proper current range, the following electrical circuit will be established through meter 36 to indicate the current flow in lead 126: From the corresponding pin on adapter 22 through the connectors 154 and 152 to a conductor within cable 24, along cable 24 to female connector 150 and the appropriate male connector 124, to pole 54 and along lead 120 to pole 50 and contact 46, through pole 42 and pole 114 to lead 110, through meter 36 and lead 100 to pole 40, and thence to pole 48, lead 102, pole 52, and lead 126 to the pin of the component within test socket 18. Thus, it may be seen that meter 36 is effectively placed in series with the circuit to this pin of the component under test. Should it be necessary to reverse the current flow through meter 36 to obtain the reading, reversing switch 38 is operated to move its poles 40 and 42 into engagement with contacts 160 and 162.

To obtain voltage readings, the movable pole 48 of the selector switch is shifted into engagement with its associated contact 106, simultaneously closing pole 50 of the selector switch against its single contact. In this manner, the circuit between poles 54 and 52 now extends along lead 120 to pole 50, and thence to contact 104 and lead 102 to pole 52. Since pole 48 is now in engagement with contact 106, lead 100 from meter 36 is connected to ground at 108, leaving only lead 110 from meter 36 connected with the circuit to the pin of the component under test. Therefore, it may be appreciated that meter 36 is now effectively placed across the pin of the component, to which lead 126 is coupled, and the voltage reference point or ground 108.

When operated in the voltage reading mode, it is also possible to measure resistance by merely disconnecting apparatus 12 from its electrical supply source and operating the ohmmeter portion of VOM 36 in the conventional manner. To facilitate zero adjustment of the meter prior to making resistance measurements, a normally open switch 164 is connected across leads 100 and 110 so that these leads may be shorted together.

It may be appreciated from the foregoing that every connection to a component under test may be rapidly checked for both proper current and voltage conditions while the component is in operation, by depressing first one push button 122 and then the next in succession until all of the connections have been checked. If desired, a vacuum tube voltmeter may be substituted for VOM 36, and any auxiliary test equipment such as an oscilloscope, a signal tracer, db meter, vacuum tube voltmeter, signal generator or a frequency counter connected to jacks 118. To place any such auxiliary equipment in the circuit of device 10, switch pole 114 is shifted into engagement with its contact 116, thereby removing VOM 36 from the circuit. The selector switch will then be operated in its voltage reading position with pole 48 closed against contact 106 and pole 50 closed against its single contact. Leads 166 and 168 from jacks 118 then place the auxiliary test equipment across the pin under test and ground 108.

Having thus described the invention, what is claimed as new and desired to be secured by Letters Patent is:

1. For use with electrical apparatus having multiconnection socket means for electrically connecting a plug-in type electrical component with its associated circuitry, a device for testing said component and circuitry while the apparatus is in operation comprising:

a mating adapter for said socket means;

an instrument for measuring electrical current and voltage;

multiconnection test socket means remote from said adapter and having the same configuration as said apparatus socket means;

a double-pole, double-throw circuit switch corresponding to each connection of said adapter respectively and being provided with contact means coupled with the corresponding connection of said test socket means, one pole of each of said switches being coupled with the corresponding connection of the adapter, the other poles of said switches being electrically interconnected; and selector switch structure coupling said other poles with said instrument, each of said circuit switches having a first switch position establishing electrical continuity between the corresponding connections of said adapter and said test socket means and bypassing said instrument, and a second switch position establishing electrical continuity between the corresponding connections of the adapter and test socket means through the selector switch structure, said structure having a current reading switch position for placing said instrument in series with the path of electrical continuity established by any of said circuit switches when one of the latter is in its second position, and a voltage reading switch position coupling the instrument in series between said other poles and a voltage reference point.

2. The invention of claim 1, wherein is provided a housing for said instrument, said test socket means, said circuit switches and said selector switch structure; a multiconductor cable connecting said one pole of each circuit switch to the corresponding connection of said adapter, and having a male connector at one end thereof and a female connector at the other end of the cable; and a male connector on said housing for reception by said female connector, said adapter including a female connector for receiving the male connector on said cable 3. The invention of claim 1, wherein said instrument includes resistance measuring means for use when said apparatus is inoperative, and wherein is provided a normally open switch coupled in shunt relationship with said instrument for shorting across the same upon actuation of the switch, whereby to facilitate adjustment of the instrument prior to resistance measuring operation thereof

References Cited

UNITED STATES PATENTS 2,023,947   12/1935   Auble _____ 324—2:
2,046,450   7/1936    Fausett _____ 324—2:

RUDOLPH V. ROLINEC, *Primary Examiner.*

E. L. STOLARUN, *Assistant Examiner.*